(12) United States Patent
Miyake et al.

(10) Patent No.: US 10,237,076 B2
(45) Date of Patent: Mar. 19, 2019

(54) COMMUNICATION DEVICE

(71) Applicant: Brother Kogyo Kabushiki Kaisha, Nagoya-shi, Aichi-ken (JP)

(72) Inventors: Takeshi Miyake, Nagoya (JP); Satoko Ando, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 169 days.

(21) Appl. No.: 15/053,724

(22) Filed: Feb. 25, 2016

(65) Prior Publication Data
US 2016/0254916 A1 Sep. 1, 2016

(30) Foreign Application Priority Data
Feb. 27, 2015 (JP) .................. 2015-039104

(51) Int. Cl.
*H04L 9/32* (2006.01)
*H04L 29/06* (2006.01)
*H04L 29/12* (2006.01)

(52) U.S. Cl.
CPC ........ *H04L 9/3263* (2013.01); *H04L 63/0823* (2013.01); *H04L 61/2015* (2013.01)

(58) Field of Classification Search
CPC .................................... H04L 9/3263
See application file for complete search history.

(56) References Cited

U.S. PATENT DOCUMENTS

| 7,886,153 | B2 | 2/2011 | Miyazawa |
| 9,130,996 | B1* | 9/2015 | Martini .................. H04L 63/20 |
| 2007/0005980 | A1 | 1/2007 | Miyazawa |
| 2010/0067033 | A1* | 3/2010 | Mori .................. G03G 15/5004 |
| | | | 358/1.13 |

(Continued)

FOREIGN PATENT DOCUMENTS

| JP | 2007-013598 A | 1/2007 |
| JP | 2013-054411 A | 3/2013 |

(Continued)

OTHER PUBLICATIONS

May 22, 2019—(JP) Notification of Reason for Rejection—App 2015-039104, Eng Tran.

*Primary Examiner* — Simon P Kanaan
(74) *Attorney, Agent, or Firm* — Banner & Witcoff, Ltd.

(57) ABSTRACT

A communication device includes a first interface configured to perform communication using a first network and a second interface configured to perform communication using a second network. The communication device is configured to generate a first server certificate including first device information for identifying the communication device in the first network and a second server certificate including second device information for identifying the communication device in the second network, receive a communication request, execute communication with the first specific device through the first interface by using the first server certificate in a case where the communication request is received from a first specific device through the (Continued)

first interface, and execute communication with the second specific device through the second interface by using the second server certificate in a case where the communication request is received from a second specific device through the second interface.

11 Claims, 9 Drawing Sheets

(56) References Cited

U.S. PATENT DOCUMENTS

| | | | |
|---|---|---|---|
| 2010/0083354 A1* | 4/2010 | Tsirtsis | H04L 29/12783 |
| | | | 726/5 |
| 2012/0233702 A1 | 9/2012 | Matsuda et al. | |
| 2013/0061041 A1 | 3/2013 | Inoue | |
| 2013/0198511 A1 | 8/2013 | Yoo et al. | |
| 2013/0309968 A1* | 11/2013 | Suzuki | H04W 4/008 |
| | | | 455/41.1 |
| 2014/0136655 A1 | 5/2014 | Oshima | |
| 2015/0194126 A1* | 7/2015 | Lee | H04N 21/4122 |
| | | | 345/2.3 |
| 2015/0254423 A1* | 9/2015 | Schaub | G06F 19/3456 |
| | | | 705/2 |

FOREIGN PATENT DOCUMENTS

| | | |
|---|---|---|
| JP | 2014-099800 A | 5/2014 |
| JP | 2014-171265 A | 9/2014 |

\* cited by examiner

FIG. 2
(FIRST ILLUSTRATIVE EMBODIMENT)

FIG. 3
(FIRST ILLUSTRATIVE EMBODIMENT)

FIG. 4

(FIRST ILLUSTRATIVE EMBODIMENT)

FIG. 6
(SECOND ILLUSTRATIVE EMBODIMENT)

FIG. 7B

COMMUNICATION DEVICE

CROSS-REFERENCE TO RELATED APPLICATIONS

This application claims priority from Japanese Patent Application No. 2015-039104 filed on Feb. 27, 2015, the entire contents of which are incorporated herein by reference.

TECHNICAL FIELD

The disclosure relates to a communication device performing communication with a specific device by using a server certificate.

BACKGROUND

Related art discloses a print server having a server certificate stored therein and a client PC (Personal Computer). The server certificate includes identification information (for example, a host name) of the print server, as owner information. The print server transmits the server certificate to the client PC in a case where an SSL communication request for requesting execution of communication using an SSL (Secure Sockets Layer) is received from the client PC. Thereby, the print server can perform communication of coded data with the client PC by using the server certificate.

The related art does not consider a configuration where the print server has a plurality of interfaces.

SUMMARY

An aspect of the disclosure is to provide a technology with which a communication device having a plurality of interfaces can appropriately perform communication with a specific device by using a server certificate.

A communication device includes: a first interface configured to perform communication using a first network; a second interface configured to perform communication using a second network; a processor; and a memory storing first device information for identifying the communication device in the first network, second device information for identifying the communication device in the second network, and instructions that, when executed by the processor, cause the communication device to perform: generating a first server certificate including the first device information as owner information and a second server certificate including the second device information as the owner information; receiving a communication request which requests execution of target communication with the communication device, the target communication using a server certificate; determining whether the communication request is a first communication request received from a first specific device belonging to the first network through the first interface or a second communication request received from a second specific device belonging to the second network through the second interface; executing target communication with the first specific device through the first interface by using the first server certificate in a case where the first communication request is received from the first specific device; and executing target communication with the second specific device through the second interface by using the second server certificate in a case where the second communication request is received from the second specific device.

A control method and a computer program for implementing the communication device, and a computer-readable storage medium having the computer program stored therein are also novel and useful. A communication system including the communication device and at least one device (for example, the first specific device, the second specific device) are also novel and useful.

Figures 1, 1A:
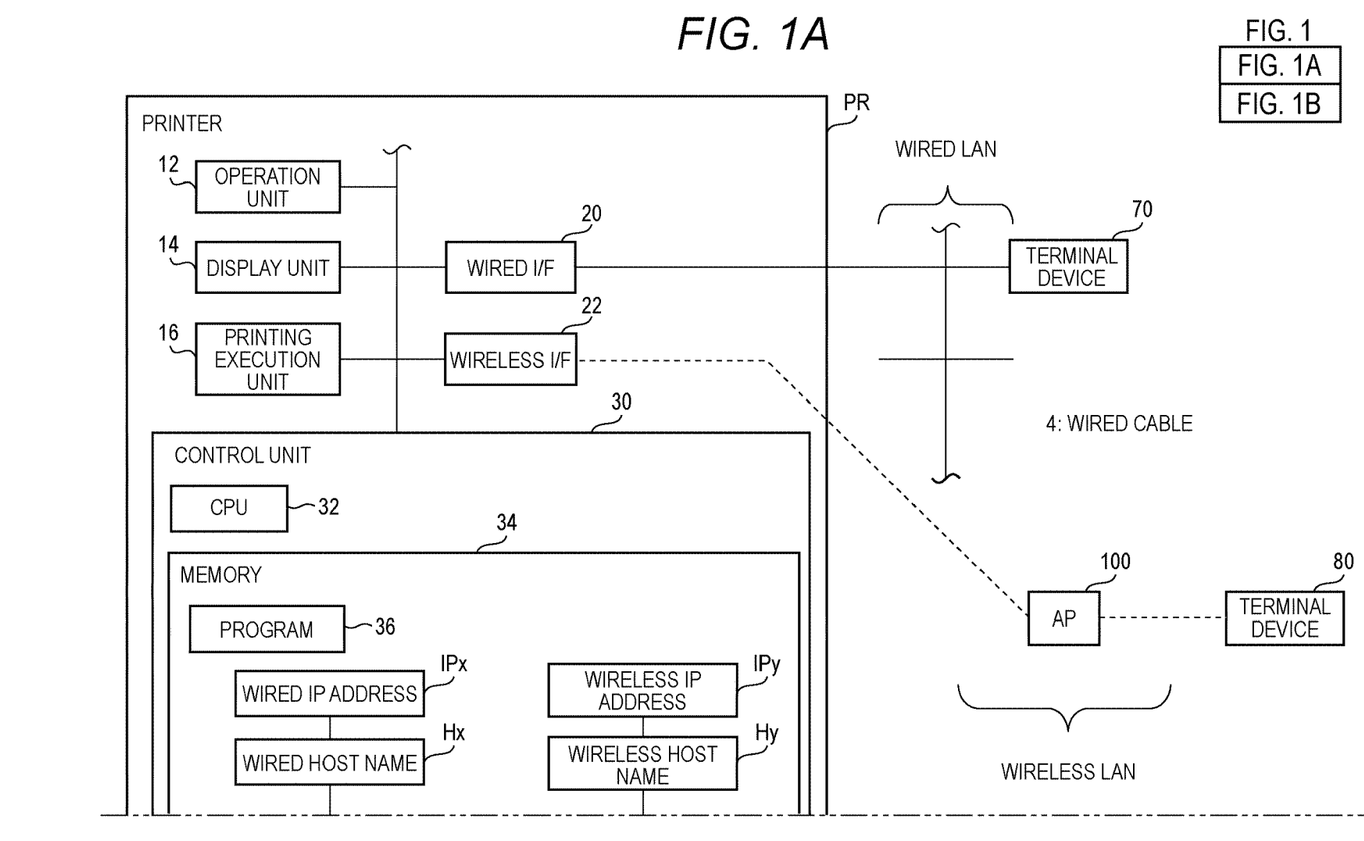
FIGS. 1A and 1B show a configuration of a communication system.
Figure 1B:
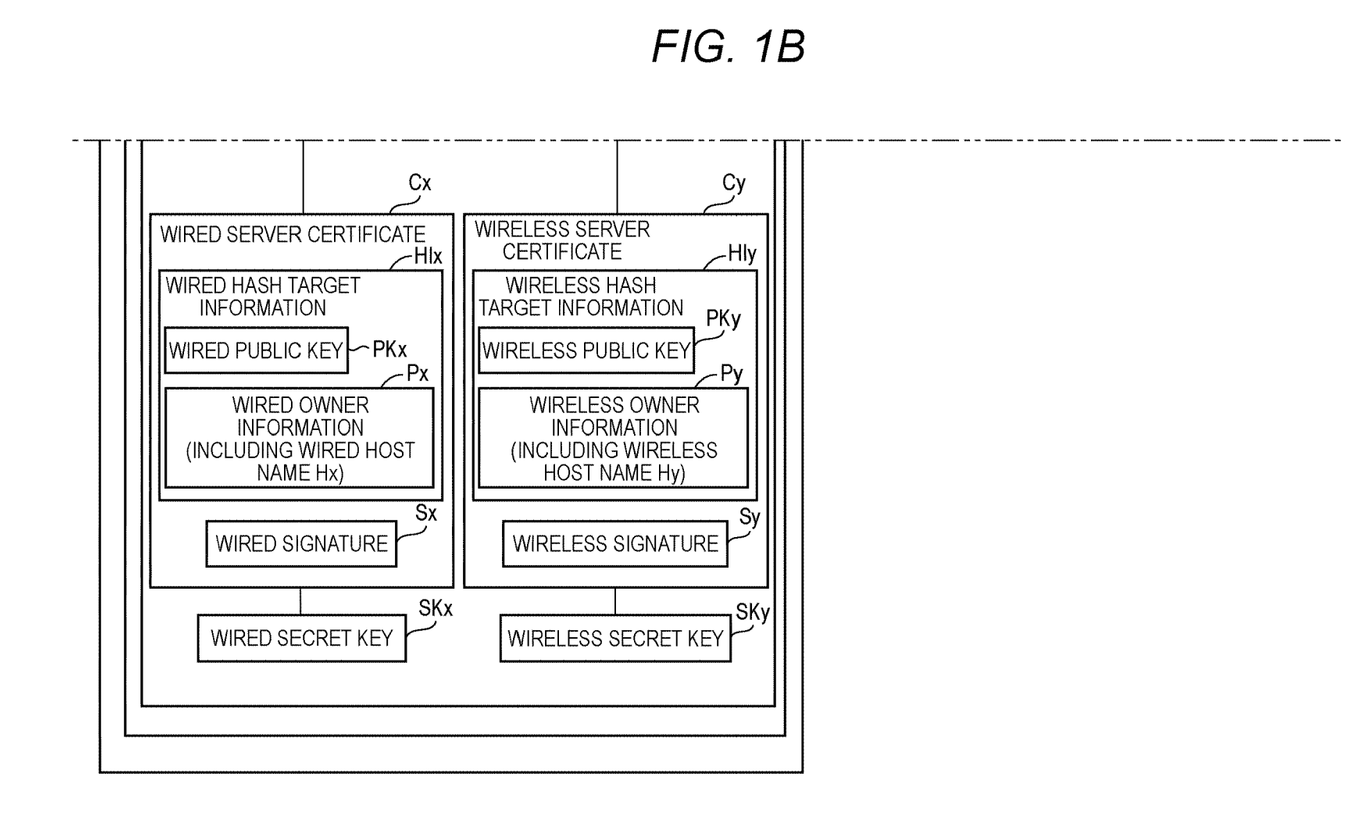

DETAILED DESCRIPTION (First Illustrative Embodiment)
(Configuration of Communication System 2; FIGS. 1A and 1B)

A communication system 2 includes a printer PR, terminal devices 70, 80 and an access point (hereinafter, referred to as 'AP') 100. The printer PR and the terminal device 70 belong to a wired LAN (Local Area Network) and can perform wired communication with each other through a wired cable 4. The printer PR and the terminal device 80 belong to a wireless LAN formed by the AP 100. The printer PR and the terminal device 80 can perform wireless communication with each other through the AP 100.

(Configuration of Printer PR)

The printer PR is a peripheral device (i.e., a peripheral device of the terminal devices 70, 80 and the like) capable of executing a printing function. The printer PR can execute the printing function, in response to a request from a peripheral device, for example. That is, the printer PR is a server device capable of providing a printing service for the peripheral device. The printer PR has an operation unit 12, a display unit 14, a printing execution unit 16, a wired interface 20, a wireless interface 22 and a control unit 30. Hereinafter, interface is referred to as 'I/F.'

The operation unit 12 has a plurality of keys, A user can input a variety of instructions to the printer PR by operating the operation unit 12. The display unit 14 is a display for displaying a variety of information. The printing execution unit 16 is a printing mechanism of an inkjet mode or a laser mode, for example. The wired I/F 20 is hardware I/F for performing wired communication. The wired I/F 20 is connected with a wired cable 4. The wireless I/F 22 is hardware I/F configured by a chip different from the wired I/F 20, and more specifically, hardware I/F for performing wireless communication in conformity to a Wi-Fi method. The Wi-Fi method is a wireless communication method for performing wireless communication in conformity to 802.11 standards of IEEE (The Institute of Electrical and Electronics Engineers, Inc.) and standards conforming to the 802.11 standards (for example 802.11a, 11b, 11g, 11n and the like), for example.

The control unit 30 has a CPU 32 and a memory 34. The CPU 32 is a processor executing a variety of processing in response to a program 36 stored in the memory 34. The memory 34 is configured by a RAM, a ROM and the like. In addition to the program 36, the memory 34 associates and stores therein a wired IP address IPx, a wired host name Hx, a wired server certificate Cx and a wired secret key SKx. Also, the memory 34 associates and stores therein a wireless IP address IPy, a wireless host name Hy, a wireless server certificate Cy and a wireless secret key Sky.

The wired IP address IPx is an IP address allotted to the wired I/F 20. The wired IP address IPx is automatically allotted to the wired I/F 20 by a DHCP (Dynamic Host Configuration Protocol) server belonging to the wired LAN, for example. In a modified embodiment, the wired IP address IPx may be a fixed IP address designated by a user, for example. The wired host name Hx is a name by which a device (for example, the terminal device 70) belonging to the wired LAN identifies the printer PR, and is allotted to the wired I/F 20 in advance by a vendor of the printer PR. That is, the wired host name Hx is already stored in the memory 34 at the stage of the shipment of the printer PR. In the meantime, the wired host name Hx may be changed into any name by a user's operation. In this case, the wired host name Hx is a name after the change.

The wired server certificate Cx is a server certificate for providing a printing service to a device (for example, the terminal device 70) belonging to the wired LAN. More specifically, the wired server certificate Cx is information necessary to perform communication using an SSL (Secure Sockets Layer) (hereinafter, referred to as 'SSL communication'). The wired server certificate Cx includes wired hash target information HIx and a wired signature Sx. The wired hash target information HIx includes a wired public key PKx and wired owner information Px. The wired public key PKx is a key that a device different from the printer PR can acquire. Specifically, for example, the terminal device 70 can acquire the wired public key PKx by receiving the wired server certificate Cx including the wired public key PKx from the printer PR. The wired owner information Px is information indicative of an owner (i.e., the printer PR) of the wired server certificate Cx, and includes the wired host name Hx. The wired signature Sx is a value obtained by using a wired secret key SKx to code a hash value, which is obtained by hashing the wired hash target information HIx.

The wired server certificate Cx is a self-signed certificate signed (i.e., generated) by the printer PR itself, and is different from a certification authority certificate that is to be signed by a certification authority different from the printer PR. In this illustrative embodiment, since the printer PR uses the wired server certificate Cx that is a self-signed certificate, it is not necessary to use the certification authority. For this reason, the printer PR can relatively easily acquire (i.e., generate) the wired server certificate Cx.

The wired secret key SKx is a key that a device different from the printer PR cannot acquire, and is a key corresponding to the wired public key PKx. For example, the data coded using the wired secret key SKx can be decoded using the wired public key PKx. However, the data cannot be decoded using the wired secret key SKx. Also, the data coded using the wired public key PKx can be decoded using the wired secret key SKx. However, the data cannot be decoded using the wired public key PKx.

The wireless IP address IPy is an IP address allotted to the wireless I/F 22. The wireless IP address IPy is automatically allotted to the wireless I/F 22 by the AP 100 configured to function as a DHCP server, for example. In a modified embodiment, the wireless IP address IPy may be a fixed IP address designated by the user, for example. The wireless host name Hy is a name by which a device (for example, the terminal device 80) belonging to the wireless LAN identifies the printer PR, and is allotted to the wireless I/F 22 in advance by a vendor of the printer PR. In this illustrative embodiment, a character string configuring the wireless host name Hy is different from a character string configuring the wired host name Hx. In the meantime, the wireless host name Hy can be changed into any name by a user's operation. In this case, the wireless host name Hy is a name after the change.

The wireless server certificate Cy is a server certificate for providing a printing service to a device (for example, the terminal device 80) belonging to the wireless LAN, and is information necessary to perform the SSL communication. The wireless server certificate Cy includes wireless hash target information HIy and a wireless signature Sy. The wireless hash target information HIy includes a wireless public key PKy and wireless owner information Py. The respective information PKy, Py, Sy is the same as the respective information PKx, Px, Sx. Also, the wireless secret key Sky is a key that a device different from the printer PR cannot acquire, and is a key corresponding to the wireless public key PKy.

(Configuration of Terminal Devices 70, 80)

The terminal devices 70, 80 may be portable devices such as a mobile phone, a smart phone, a notebook, a tablet PC and the like or stationary devices such as a desktop computer, a television and the like. The terminal device 80 supports the method, like the printer PR.

Figure 2:
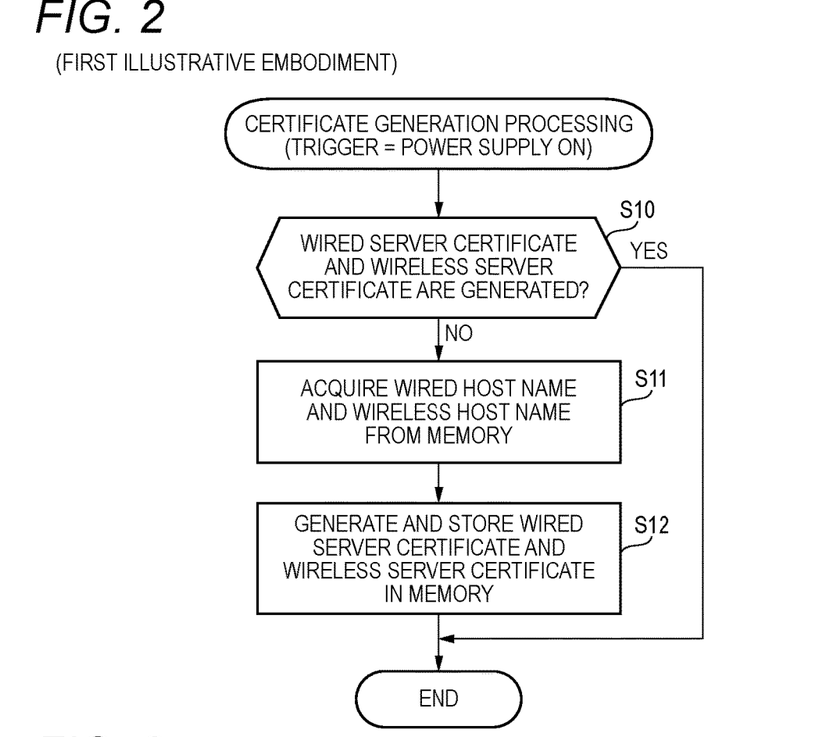
FIG. 2 is a flowchart of certificate generation processing in a first illustrative embodiment.

(Certificate Generation Processing; FIG. 2)

Subsequently, certificate generation processing that is to be executed by the CPU 32 of the printer PR is described with reference to FIG. 2. The certificate generation processing is executed in response to a power supply of the printer PR being turned on by the user, i.e., in response to the printer PR being started up. In a situation where the power supply of the printer PR becomes ON, the host names Hx, Hy of the printer PR is stored in the memory 34 but the IP addresses IPx, IPy is not stored. Further, the server certificates Cx, Cy and the secret keys SKx, Sky are stored in the memory 34 if the processing of FIG. 2 has been executed one time or more. However, if the processing of FIG. 2 has not been executed before, the server certificates Cx, Cy and the secret keys SKx, Sky are not stored in the memory 34.

In S10, the CPU 32 determines whether the wired server certificate Cx and the wireless server certificate Cy are generated. Specifically, in a case where the wired server certificate Cx and the wireless server certificate Cy are stored in the memory 34 (YES in S10), the CPU 32 ends the processing of FIG. 2. On the other hand, in a case where the wired server certificate Cx and the wireless server certificate Cy are not stored in the memory 34 (NO in S10), the CPU 32 acquires the wired host name Hx and the wireless host name Hy from the memory 34, in S11.

In S12, the CPU 32 generates the wired server certificate Cx and the wireless server certificate Cy and stores the wired server certificate Cx and the wireless server certificate Cy in the memory 34. Specifically, first, the CPU 32 generates the wired public key PKx and the wired secret key SKx based on a predetermined algorithm, and also generates the wired owner information Px by using the wired host name Hx acquired in S11. Then, the CPU 32 hashes the wired hash target information HIx including the wired public key PKx and the wired owner information Px to calculate a hash value, and codes the hash value to generate the wired signature Sx by using the wired secret key SKx. Then, the CPU 32 generates the wired server certificate Cx including the wired public key PKx, the wired owner information Px and the wired signature Sx, and associates and stores the wired server certificate Cx with the wired host name Hx in the memory 34. Also, the CPU 32 associates and stores the wired secret key SKx with the wired host name Hx and the wired server certificate Cx in the memory 34. By the same method, the CPU 32 generates the wireless server certificate Cy by using the wireless host name Hy acquired in S11, and associates and stores the wireless server certificate Cy with the wireless host name Hy in the memory 34. Also, the CPU 32 associates and stores the wireless secret key Sky with the wireless host name Hy and the wireless server certificate Cy in the memory 34. When the processing of S12 is over, the processing of FIG. 2 is over.

Figure 3:
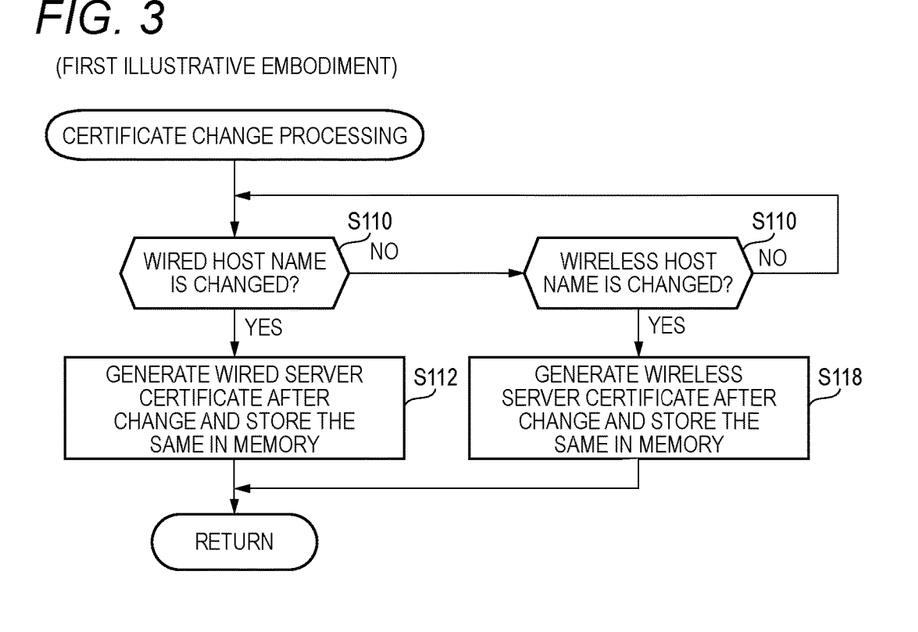
FIG. 3 is a flowchart of certificate change processing in the first illustrative embodiment.

(Certificate Change Processing; FIG. 3)

Subsequently, certificate change processing that is to be executed by the CPU 32 of the printer PR is described with reference to FIG. 3. In a situation where the processing of FIG. 3 is executed, the respective server certificates Cx, Cy are stored in the memory 34 (see S12 of FIG. 2).

In S110, the CPU 32 monitors whether the wired host name Hx is changed. In a case where an operation for changing the wired host name Hx is executed on the operation unit 12 by the user (YES in S110), the CPU 32 proceeds to S112.

In S112, by the same method as S12 of FIG. 2, the CPU 32 generates the wired server certificate Cx after the change by using the wired host name Hx after the change, and associates and stores the wired server certificate Cx after the change with the wired host name Hx after the change in the memory 34. In the meantime, when executing the processing of S112, the CPU 32 may or may not change the wired public key PKx and the wired secret key SKx.

In S116, the CPU 32 monitors whether the wireless host name Hy is changed. In a case where an operation for changing the wireless host name Hy is executed on the operation unit 12 by the user (YES in S116), the CPU 32 proceeds to S118.

In S118, by the same method as S12 of FIG. 2, the CPU 32 generates the wireless server certificate Cy after the change by using the wireless host name Hy after the change, and associates and stores the wireless server certificate Cy after the change with the wireless host name Hy after the change in the memory 34. Here, when executing the processing of S118, the CPU 32 may or may not change the wireless public key PKy and the wireless secret key SKy.

The printer PR executes the processing of S112 or S118 in a case where the wired host name Hx or the wireless host name Hy is changed. Therefore, the printer PR can appropriately perform SSL communication by using the wired server certificate Cx after the change or the wireless server certificate Cy after the change. When the processing of S112 or S118 is over, the printer PR returns to the monitoring processing of S110 and S116.

Figure 4:
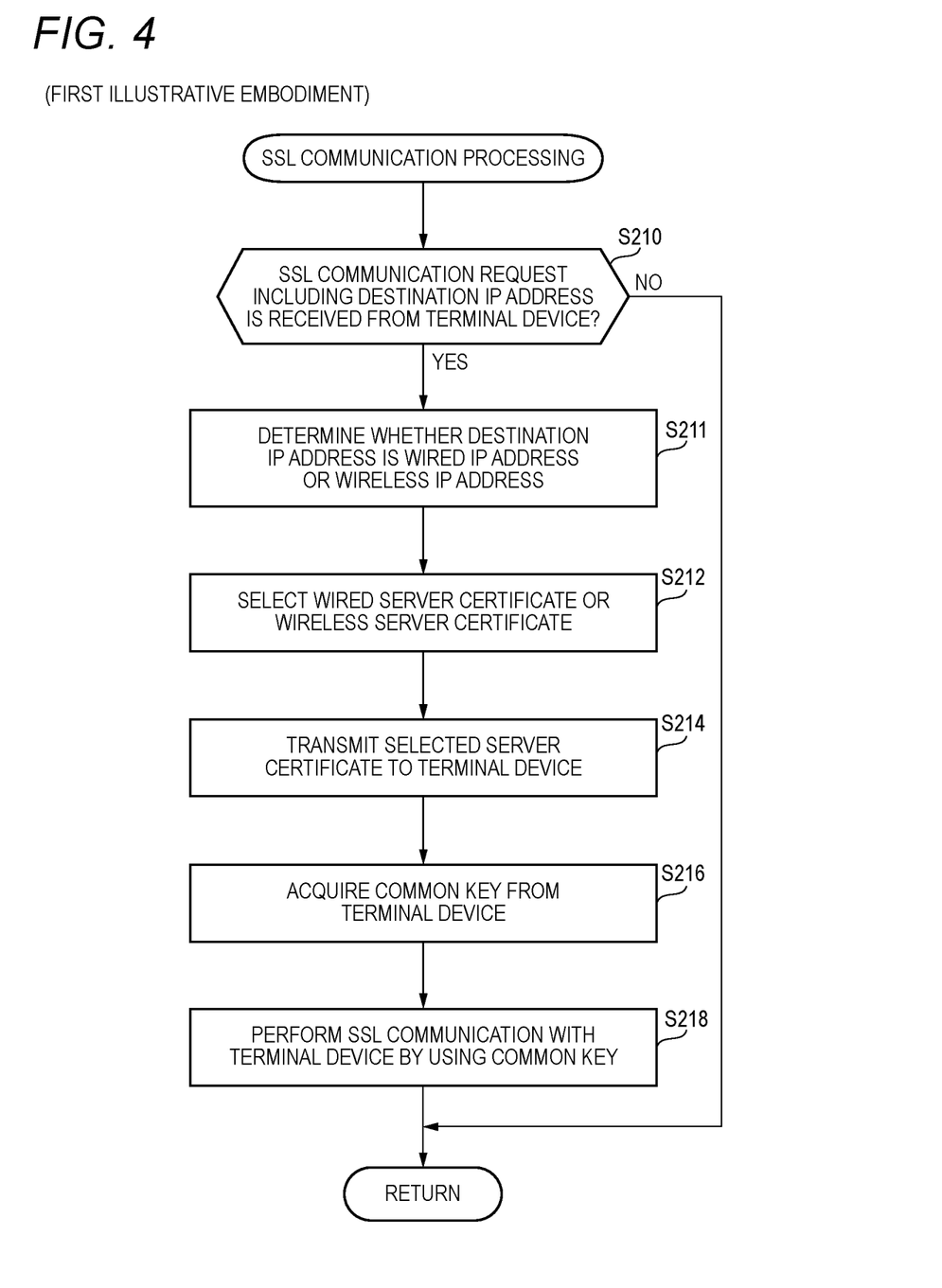
FIG. 4 is a flowchart of SSL communication processing in the first illustrative embodiment.

(SSL Communication Processing; FIG. 4)

Subsequently, SSL communication processing that is to be executed by the CPU 32 of the printer PR is described with reference to FIG. 4. In a situation where the processing of FIG. 4 is executed, the respective server certificates Cx, Cy are stored in the memory 34 (see S12 of FIG. 2). Also, in the following, it is assumed that the wired cable 4 is connected to the wired I/F 20, and wireless connection with the AP 100 through the wireless I/F 22 is established. That is, the respective IP addresses IPx, IPy are stored in the memory 34.

In S210, the CPU 32 monitors whether an SSL communication request for requesting execution of the SSL communication is received from the terminal device (for example 70, 80) through the wired I/F 20 or the wireless I/F 22. In a case where the SSL communication request is received from the terminal device (YES in S210), the CPU 32 proceeds to S211. The SSL communication request includes a destination IP address indicative of the wired IP address IPx or wireless IP address IPy of the printer PR.

In S211, the CPU 32 determines whether the destination IP address included in the SSL communication request is the wired IP address IPx or the wireless IP address IPy. In S212, the CPU 32 selects the wired server certificate Cx or the wireless server certificate Cy, depending on a determination result of S211. Specifically, in a case where it is determined in S211 that the destination IP address is the wired IP address IPx, the CPU 32 selects the wired server certificate Cx, which is stored with being associated with the wired IP address IPx in the memory 34, in S212. On the other hand, in a case where it is determined in S211 that the destination IP address is the wireless IP address IPy, the CPU 32 selects the wireless server certificate Cy, which is stored with being associated with the wireless IP address IPy in the memory 34, in S212.

In S214, the CPU 32 transmits the selected server certificate to the terminal device. Specifically, in a case where the selected certificate is the wired server certificate Cx, the CPU 32 transmits the wired server certificate Cx to the terminal device (for example, 70) through the wired I/F 20. On the other hand, in a case where the selected certificate is the wireless server certificate Cy, the CPU 32 transmits the wireless server certificate Cy to the terminal device (for example, 80) through the wireless I/F 22.

In S216, the CPU 32 receives a common key coded using the public key included in the server certificate transmitted in S214, from the terminal device. The CPU 32 acquires the common key by decoding the common key with a secret key. The common key is different from the public key and the secret key, and is a key that can be commonly used for coding and decoding. That is, the data coded using the common key can be decoded using the common key. Here, in a case where the wired server certificate Cx is selected in S212, the CPU 32 decodes the common key by using the wired secret key SKx, which is stored with being associated with the wired server certificate Cx in the memory 34, in S216. On the other hand, in a case where the wireless server certificate Cy is selected in S212, the CPU 32 decodes the public key by using the wireless secret key Sky, which is stored with being associated with the wireless server certificate Cy in the memory 34, in S216. Since the printer PR acquires the common key in S216, the printer PR and the terminal device can use the same common key (i.e., the common key can be shared). As described above, the common key that is transmitted from the terminal device to the printer PR is coded. Therefore, if there is no secret key of the printer PR, the coded common key cannot be decoded. Therefore, for example, even when a device different from the printer PR illegally receives the coded common key, the device cannot decode the coded common key because the device cannot acquire the secret key from the printer PR.

In S218, the CPU 32 performs SSL communication with the terminal device by using the acquired common key. For example, in a case where an image file coded using the common key is received from the terminal device, the CPU 32 decodes the image file by using the common key. Then, the CPU 32 can enable the printing execution unit 16 to print an image represented by the decoded image file.

Figure 5A:
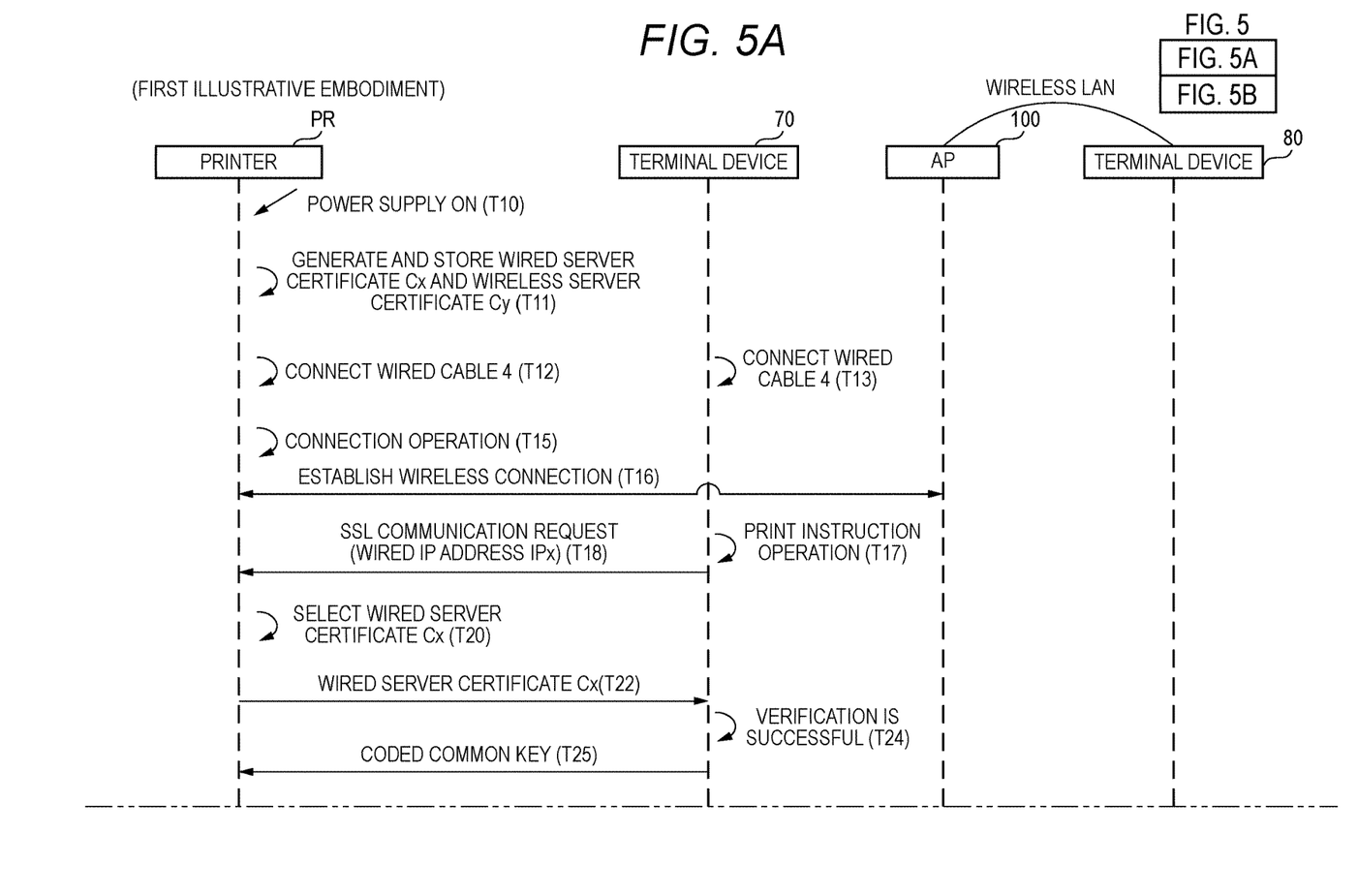
FIGS. 5A and 5B are sequence diagrams of a specific case in the first illustrative embodiment.
Figure 5B:
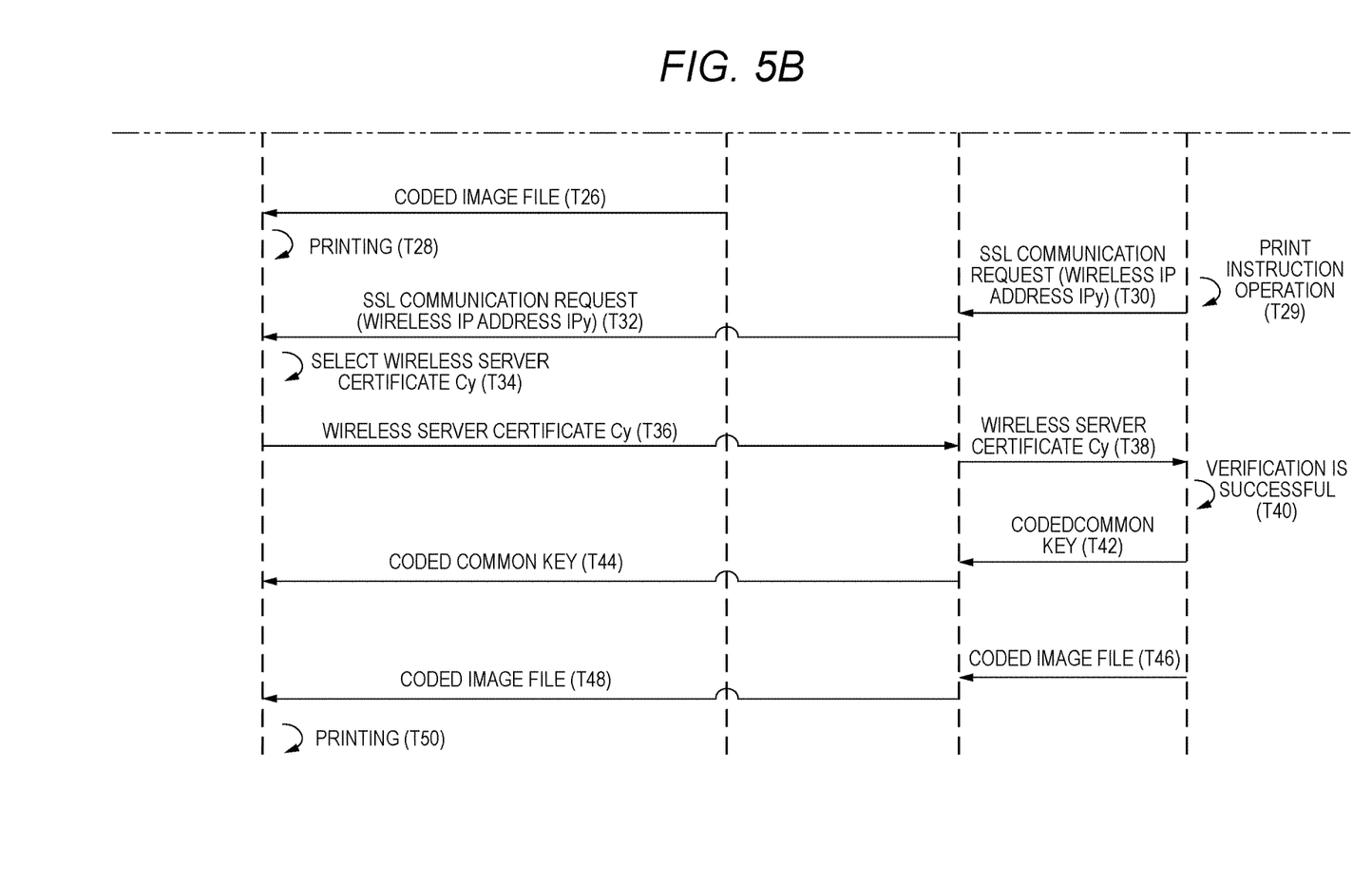

(Specific Case; FIGS. 5A and 5B)

Subsequently, a specific case that is to be implemented in accordance with the flowcharts of FIGS. 2 to 4 is described with reference to FIGS. 5A and 5B. At an initial state of FIG. 5A, the processing of FIG. 2 has not been executed before and the respective server certificates Cx, Cy are not stored in the memory 34 of the printer PR. Also, the terminal device 80 belongs to the wireless LAN formed by the AP 100.

In T10, the user turns on the power supply of the printer PR (trigger of FIG. 2). In T11, the printer PR generates the wired server certificate Cx and the wireless server certificate Cy, and stores the generated wired server certificate Cx and wireless server certificate Cy (S12 of FIG. 2).

In T12 and T13, the user connects the wired cable 4 to the printer PR and the terminal device 70. Thereby, the printer PR and the terminal device 70 are enabled to belong to the wired LAN. Then, the wired IP address IPx is allotted to the printer PR by a DHCP server (not shown) belonging to the wired LAN. In this case, the printer PR associates and stores the wired IP address IPx with the wired host name Hx.

In T15, the user executes a connection operation for establishing wireless connection between the printer PR and the AP 100, on the printer PR. Thereby, in T16, the printer PR establishes the wireless connection with the AP 100, and is thus enabled to belong to the wireless LAN formed by the AP 100. Then, the wireless IP address IPy is allotted to the printer PR by the AP 100 functioning as the DHCP server. In this case, the printer PR associates and stores the wireless IP address IPy with the wireless host name Hy.

Regarding the processing of T11 to T16, in a modified embodiment, the printer PR may generate and store the wired server certificate Cx after being belonged to the wired LAN and storing the wired IP address IPx. Also, after the printer PR is belonged to the wireless LAN and stores the wireless IP address IPy, the printer PR may generate and store the wireless server certificate Cy.

In T17, the user executes a print instruction operation at the terminal device 70. The print instruction operation includes a destination designation operation for designating the printer PR as a destination device of the SSL communication request. Specifically, the destination designation operation is an operation of designating the wired host name Hx of the printer PR as a destination host name indicative of the destination device. In a case where the destination designation operation is executed, the terminal device 70 executes a name resolution to acquire the destination IP address (i.e., the wired IP address IPx) based on the wired host name Hx. Specifically, for example, the terminal device 70 transmits the wired host name Hx to a DNS (Domain Name System) server (not shown) belonging to the wired LAN and receives the wired IP address IPx from the DNS server. The print instruction operation further includes an image designation operation for designating an image file, which indicates an image that is to be printed by the printer PR, from one or more image files stored in the terminal device 70.

In T18, the printer PR receives the SSL communication request, which includes the wired IP address IPx as the destination IP address, from the terminal device 70 through the wired I/F 20 (YES in S210 of FIG. 4). In this case, the printer PR determines that the destination IP address is the wired IP address IPx (S211), and selects the wired server certificate Cx associated with the wired IP address IPx, in T20 (S212). In T22, the printer PR transmits the selected wired server certificate Cx to the terminal device 70 through the wired I/F 20 (S214).

In T24, the terminal device 70 verifies the wired server certificate Cx. Specifically, the terminal device 70 that executes first to third verifications described hereinafter. First, in the first verification, the terminal device 70 tries to decode the wired signature Sx in the wired server certificate Cx by using the wired public key PKx in the wired server certificate Cx. In a case where a wired hash value can be acquired by using the wired public key PKx to decode the wired signature Sx, the terminal device 70 determines that the first verification is successful, and in a case where the wired signature Sx cannot be decoded, the terminal device 70 determines that the first verification has failed. After the successful first verification, in the second verification, the terminal device 70 hashes the wired hash target information HIx included in the wired server certificate Cx to calculate a hash value. In a case where the calculated hash value coincides with the wired hash value acquired in the first verification, the terminal device 70 determines that the second verification is successful, and in a case where the hash values do not coincide with each other, the terminal device 70 determines that the second verification has failed. After the successful second verification, the terminal device 70 determines in the third verification whether the host name Hx in the owner information Px included in the wired server certificate Cx coincides with the destination host name designated in T17. In a case where the host name Hx coincides with the destination host name, the terminal device 70 determines that the third verification is successful, and in a case where the host name fix does not coincide with the destination host name, the terminal device 70 determines that the third verification has failed. In a case where all the first to third verifications are successful, the terminal device 70 determines that the verification for the wired server certificate Cx is successful. In T24, a case where the verification for the wired server certificate Cx is successful is shown.

In T25, the terminal device 70 codes the common key by using the wired public key PKx included in the wired server certificate Cx and transmits the common key to the printer PR. Thereby, in T25, the printer PR receives the common key from the terminal device 70 through the wired I/F 20, and decodes the common key by using the wired secret key SKx (S216 of FIG. 4).

In T26, the terminal device 70 codes the image file designated in T17 by using the common key and transmits the image file to the printer PR. Thereby, in T26, the printer PR receives the image file from the terminal device 70 through the wired I/F 20 (S218 of FIG. 4), and decodes the image file by using the common key. In T28, the printer PR prints an image represented by the image file.

Subsequently, a case where the printer PR executes the printing in response to a request from the terminal device 80 belonging to the wireless LAN is described. In T29, the user executes a print instruction operation including a destination designation operation and an image designation operation at the terminal device 80. In the destination designation operation, the user designates the wireless host name Hy of the printer PR, as the destination host name. The terminal device 80 executes a name resolution using the wireless host name Hy, thereby acquiring the destination IP address (i.e., the wireless IP address IPy of the printer PR) from a DNS server (not shown) belonging to the wireless LAN, for example.

In T30 and T32, the printer PR receives an SSL communication request, which includes the wireless IP address IPy as the destination IP address, from the terminal device 80 through the wireless I/F 22 (YES in S210 of FIG. 4). The printer PR determines that the destination IP address is the wireless IP address IPy (S211), and selects the wireless server certificate Cy associated with the wireless IP address IPy, in T34 (S212). In T36 and T38, the printer PR transmits the selected wireless server certificate Cy to the terminal device 80 through the wireless I/F 22 (S214). The processing of T40 is the same as the processing of T24, and the verification for the wireless server certificate Cy is successful.

In T42 and T44, the printer PR receives, from the terminal device 80, the common key coded by the terminal device 80 using the wireless public key PKy included in the wireless server certificate Cy and decodes the common key by using the wireless secret key Sky to acquire the common key (S216 of FIG. 4).

In T46 and T48, the printer PR receives the image file coded using the common key by the terminal device 80 from the terminal device 80 (S218 of FIG. 4), and decodes the image file by using the common key. In T50, the printer PR prints an image represented by the decoded image file.

(Effects)

In case of the device having the plurality of interfaces, like the printer PR of the above case, the identification information (i.e., the host name) of the device is allotted to each interface. In this case, there is a high possibility that the respective host names are different. According to the above case, the printer PR generates the wired server certificate Cx, which includes the wired host name Hx as the wired owner information Px (T11). For this reason, the printer PR can appropriately perform communication of an image file with the terminal device 70 through the wired I/F 20 by using the wired server certificate Cx (T22 to T26). Also, the printer PR further generates the wireless server certificate Cy, which includes the wireless host name Hy as the wireless owner information Py (T11). For this reason, the printer PR can appropriately perform communication of an image file with the terminal device 80 through the wireless I/F 22 by using the wireless server certificate Cy (T36 to T48). In this way, the printer PR can appropriately perform communication with the terminal devices 70, 80 by using the plurality of server certificates Cx, Cy corresponding to the plurality of interfaces 20, 22.

Also, in the above case, before the SSL communication request is received (i.e., before T18, T32), the printer PR generates the wired server certificate Cx and the wireless server certificate Cy and stores the generated wired server certificate Cx and wireless server certificate Cy (T11). Also, the printer PR does not have to generate the wired server certificate Cx in response to receiving the SSL communication request from the terminal device 70 (T18). Also, the printer PR does not have to generate the wireless server certificate Cy in response to receiving the SSL communication request from the terminal device 80 (T32). Thereby, the printer PR can rapidly perform communication of an image file with the terminal devices 70, 80, which are the transmission sources of the communication request.

Also, in this illustrative embodiment, the printer PR has a function of belonging to both the wired LAN and the wireless LAN at the same time. Thereby, in a situation where the printer PR belongs to both the wired LAN and the wireless LAN at the same time, the printer PR can appropriately perform communication with the terminal devices 70, 80 by using the wired server certificate Cx and the wireless server certificate Cy.

Also, in a case where each of the host names Hx, Hy is changed by the user, the printer PR automatically updates the respective server certificates Cx, Cy by using the respective host names Hx, Hy after the change. For this reason, the user does not have to execute an operation for updating the respective server certificates Cx, Cy. Also, in this illustrative embodiment, the respective server certificates Cx, Cy include the respective host names Hx, Hy as the owner information. Regarding this, in a comparative example, a configuration where the IP addresses IPx, IPy are included as the owner information is considered, for example. However, the IP address is more likely to be changed, as compared to the host name. Therefore, in the comparative example, the update frequency of the respective server certificates Cx, Cy increases. In contrast, according to this illustrative embodiment, since the printer PR does not have to frequently update the respective server certificates Cx, Cy, it is possible to reduce the processing load for the update.

Also, in this illustrative embodiment, the printer PR selects the wired server certificate Cx or the wireless server certificate Cy based on the destination IP address included in the SSL communication request. For this reason, the printer PR can appropriately select the wired server certificate Cx or the wireless server certificate Cy even if the printer PR does not receive the respective host names Hx, Hy of the printer PR from the respective terminal devices 70, 80.

(Correspondence Relation)

The printer PR, the terminal device 70 and the terminal device 80 are examples of the 'communication device', the 'first specific device', and the 'second specific device', respectively. The wired I/F 20 and the wireless I/F 22 are examples of the 'first interface' and the 'second interface', respectively. The wired LAN and the wireless LAN are examples of the 'first network' and the 'second network', respectively. The wired host name Hx is an example of the 'first device information' and the 'first host name.' The wireless host name Hy is an example of the 'second device information' and the 'second host name.' The wired server certificate Cx and the wireless server certificate Cy are examples of the 'first server certificate' and the 'second server certificate', respectively. The wired IP address IPx and the wireless IP address IPy are examples of the 'first IP address' and the 'second IP address', respectively. The SSL communication request in T18 and the SSL communication request in T32 are examples of the 'first communication request' and the 'second communication request', respectively.

The processing of S12 in FIG. 2 and the processing of S210, S211 and S212 in FIG. 4 are examples of the 'generating', the 'receiving', the 'determining' and the 'selecting', respectively. The processing of S214 to S218 is an example of the 'performing communication with the first specific device' and the 'executing target communication with the second specific device'.

Figure 6:
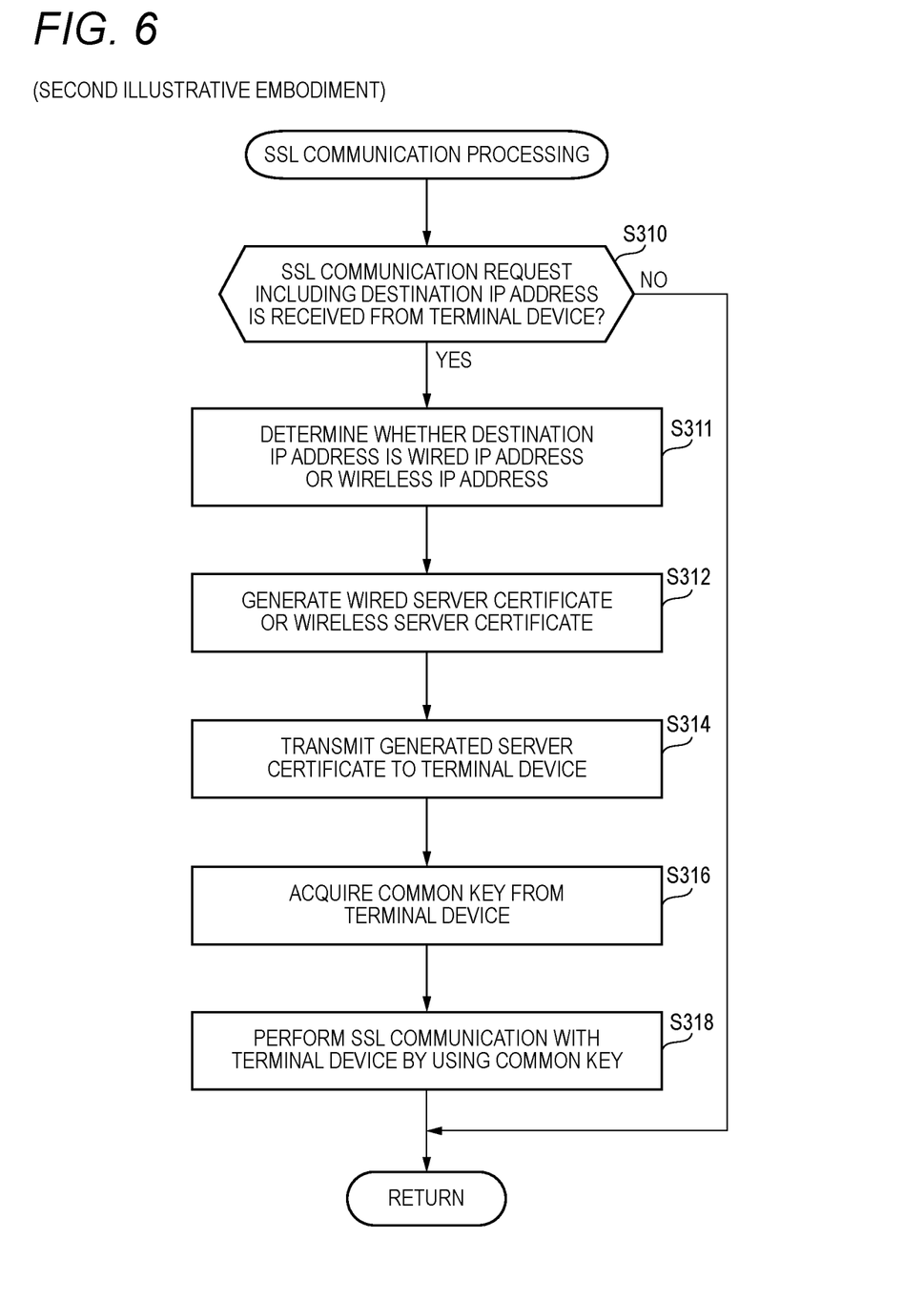
FIG. 6 is a flowchart of the SSL communication processing in a second illustrative embodiment.

(Second Illustrative Embodiment; FIG. 6)

In this illustrative embodiment, the processing of FIGS. 2 and 3 is not executed. Also, the SSL communication processing of FIG. 6 is executed, instead of the SSL communication processing of FIG. 4. Specifically, the printer PR generates the server certificate (Cx or Cy) when the SSL communication request is received, not when the power supply of the printer PR becomes ON. In a situation where the SSL communication processing of FIG. 6 is executed, the respective server certificates Cx, Cy are not stored in the memory 34, and the respective IP addresses IPx, IPy are stored in the memory 34. The processing of S310 and S311 is the same as the processing S210 and S211 of FIG. 4.

In S312, the CPU 32 generates the wired server certificate Cx or the wireless server certificate Cy. Specifically, in a case where it is determined in S311 that the destination IP address is the wired IP address IPx, the CPU 32 generates, in S312, the wired server certificate Cx by using the wired host name fix stored with being associated with the wired IP address IPx in the memory 34, like S12 of FIG. 2. On the other hand, in a case where it is determined in S311 that the destination IP address is the wireless IP address IPy, the CPU 32 generates, in S312, the wireless server certificate Cy by using the wireless host name Hy stored with being associated with the wireless IP address IPy in the memory 34, like S12 of FIG. 2.

Meanwhile, in S312, the CPU 32 temporarily stores the server certificate (Cx or Cy) and the secret key (SKx or SKy) in the memory 34. Specifically, the CPU 32 stores the server certificate and the secret key in the memory 34 until the processing of S318 is over. When the processing of S318 is over, the CPU 32 deletes the server certificate and the secret key from the memory 34.

In S314, the CPU 32 transmits the generated server certificate to the terminal device. Specifically, in a case where the wired server certificate Cx is generated in S312, the CPU 32 transmits the wired server certificate Cx to the terminal device (for example, 70) through the wired I/F 20, in S314. On the other hand, in a case where the wireless server certificate Cy is generated in S312, the CPU 32 transmits the wireless server certificate Cy to the terminal device (for example, 80) through the wireless I/F 22, in S314. The processing of S316 and S318 is the same as the processing of S216 and S218 of FIG. 4, respectively.

Figure 7A:
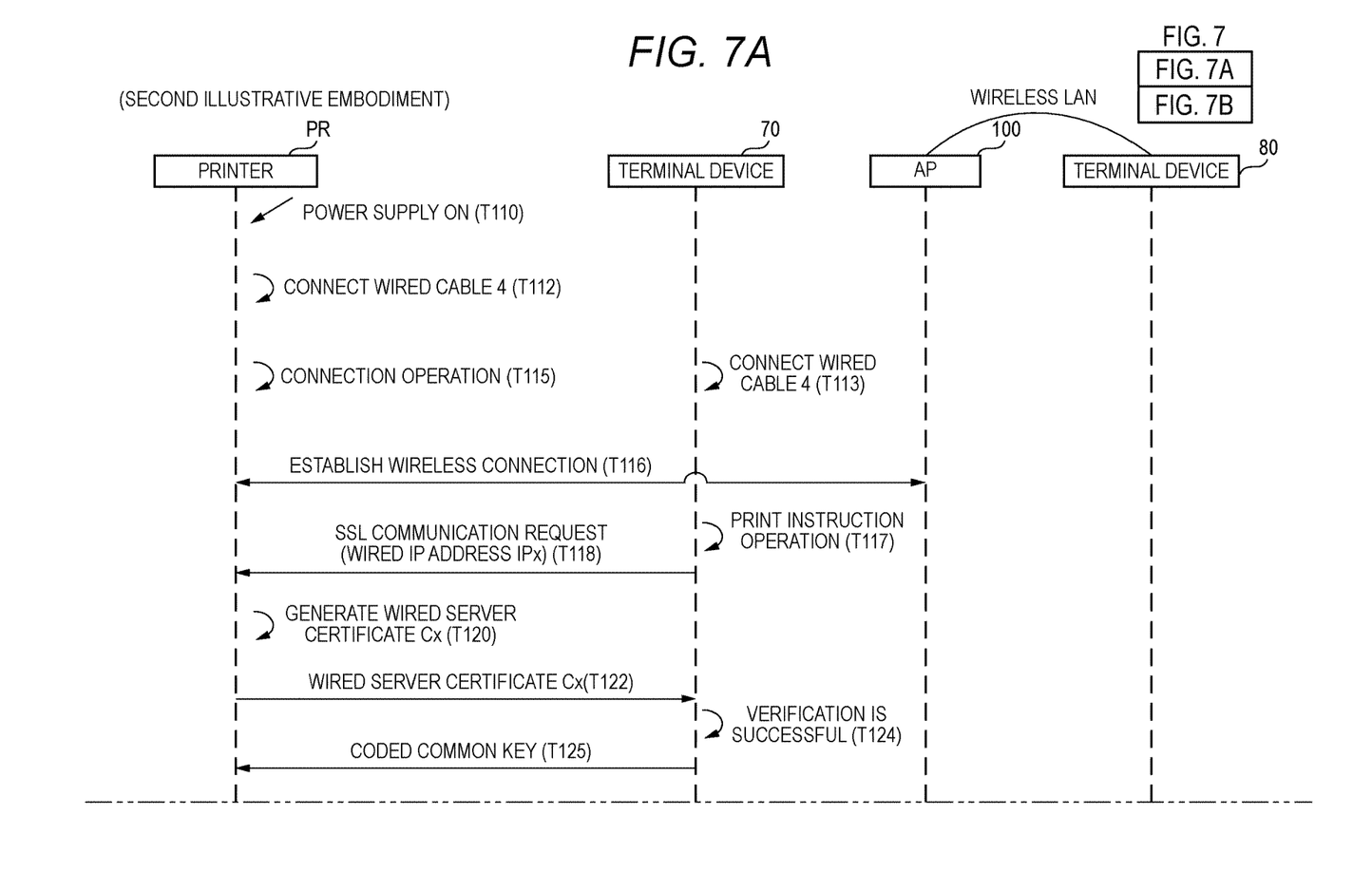
FIGS. 7A and 7B are sequence diagrams of a specific case in the second illustrative embodiment.
Figure 7B:
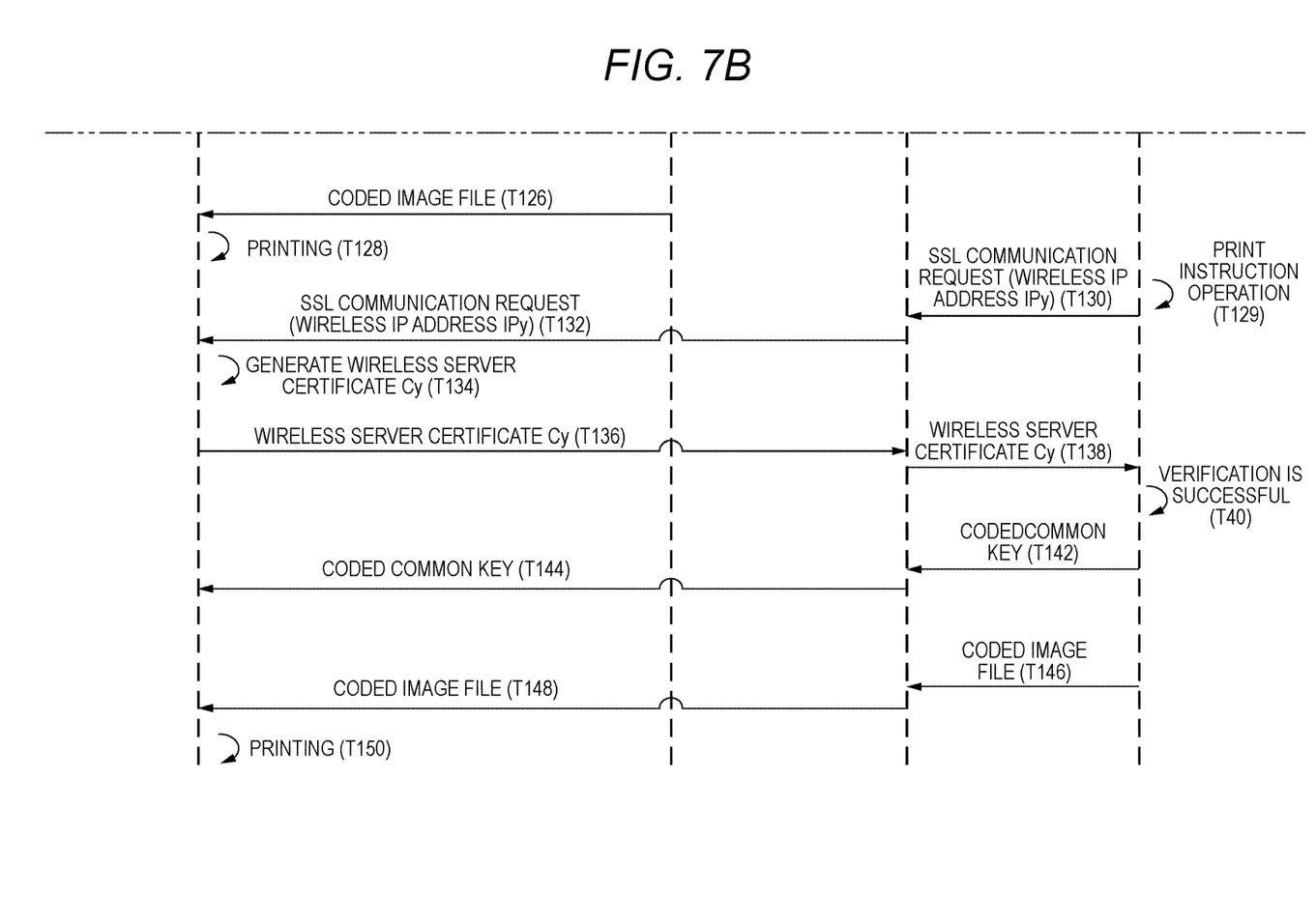

(Specific Case; FIGS. 7A and 7B)

Subsequently, a specific case that is to be implemented in accordance with the flowchart of FIG. 6 is described with reference to FIGS. 7A and 7B. An initial state of this case is the same as the initial state of the case shown in FIG. 5A. The processing of T110 to T118 is the same as the processing of T10 to T18 of FIG. 5A.

In T120, the printer PR generates the wired server certificate Cx by using the wired host name Hx associated with the wired IP address IPx when the SSL communication request is received from the terminal device 70 (S312 of FIG. 6). The processing of T122 to T128 is the same as the processing of T22 to T28 of FIGS. 5A and 5B. Also in this case, the printer PR can appropriately perform communication of an image file with the terminal device 70 by using the wired server certificate Cx.

Also, the processing of T129 to T132 is the same as the processing of T29 to T32 of FIG. 5B. In T134, the printer PR generates the wireless server certificate Cy by using the wireless host name Hy stored with being associated with the wireless IP address IPy in the printer PR when reception of the SSL communication request is received from the terminal device 80 (S312 of FIG. 6). The processing of T136 to T150 is the same as the processing of T36 to T50 of FIG. 5B. Also in this case, the printer PR can appropriately perform communication of an image file with the terminal device 80 by using the wireless server certificate Cy.

In this illustrative embodiment, the printer PR does not have to store both the wired server certificate Cx and the wireless server certificate Cy before the SSL communication request is received. For this reason, it is possible to save the storage capacity of the memory 34 of the printer PR. Meanwhile, in this illustrative embodiment, the processing of S310, S311 and S312 of FIG. 6 is an example of the 'receiving', the 'determining' and the 'generating', respectively. The processing of S314 to S318 is an example of the 'performing communication with the first specific device' and the 'performing communication with the second specific device'.

Although the specific embodiments of the disclosure have been described in detail, the embodiments are just exemplary, not to limit the claims. The technology defined in the claims includes a variety of changes and modifications to the above specific embodiments. Modified embodiments of the illustrative embodiments are described hereinafter.

(Modified Embodiment 1)

In the respective illustrative embodiments, the printer PR has one wired I/F 20 and one wireless I/F 22. In a modified embodiment, the printer PR may have two wireless hardware I/F configured by two different chips. The printer PR may be configured to generate the two wireless server certificates based on two wireless host names corresponding to the two wireless hardware I/F. In a case where the SSL communication request is received from the terminal device through one wireless hardware I/F, the printer PR performs communication with the terminal device by using one wireless server certificate corresponding to the one wireless hardware I/F. Also, in a case where the SSL communication request is received from the terminal device through the other wireless hardware I/F, the printer PR performs communication with the terminal device by using the other wireless server certificate corresponding to the other wireless hardware I/F. That is, both the 'first network' and the 'second network' may be the wireless network.

Also, in another modified embodiment, the printer PR may have two wired hardware I/F configured by two different chips. The printer PR may he configured to generate the two wired server certificates based on two wired host names corresponding to the two wired hardware I/F. That is, both the 'first network' and the 'second network' may he the wired network.

(Modified Embodiment 2)

The printer PR may have one wireless hardware I/F configured by one chip, and the one wireless hardware I/F may be configured to function as two software wireless I/F. One of the two software wireless I/F is an interface for performing wireless communication using the wireless LAN including the AP 100, and the other is an interface for performing wireless communication conforming to a WFD (Wi-Fi Direct) method designed by the Wi-Fi Alliance, i.e., wireless communication using the wireless LAN not including an AP. The printer PR may be configured to generate the two wireless server certificates based on two wireless host names corresponding to the two software wireless I/F.

(Modified Embodiment 3)

In the first illustrative embodiment, the printer PR generates the respective server certificates Cx, Cy and stores the respective server certificates Cx, Cy when the power supply of the printer PR is turned on by the user. Instead of this configuration, the printer PR may generate the respective server certificates Cx, Cy and store the respective server certificates Cx, Cy when an operation (for example, an operation for generating a certificate) different from the operation for turning on the power supply of the printer PR is executed on the operation unit 12 by the user. That is, the timing at which the server certificate is generated is not limited to the start-up timing of the communication device and the receiving timing of the communication request.

(Modified Embodiment 4)

The wired server certificate Cx may include, as the wired owner information Px, the wired IP address IPx, instead of the wired host name Hx. Also, the wireless server certificate Cy may include, as the wireless owner information Py, the wireless IP address IPy, instead of the wireless host name Hy. That is, the 'first device information' and the 'second device information' may not be the 'first host name' and the 'second host name', respectively.

(Modified Embodiment 5)

The server certificates Cx, Cy may be certification authority certificates that are generated and signed by a certification authority different from the printer PR and are supplied to the printer PR. That is, the 'first server certificate' and the 'second server certificate' may not be the self-signed certificate, respectively. In this modified embodiment, it is possible to further increase the reliability of the server certificate.

(Modified Embodiment 6)

The 'communication device' is not limited to the printer PR capable of executing the printing function, and may be a scanner capable of executing a scanning function, a multi-functional device capable of executing printing and scanning functions, and the like, for example. Also, the 'communication device' may he other device (for example, a PC, a server and a portable terminal (a mobile phone, a smart phone, a PDA and the like)). The 'communication device' includes all devices having at least two interfaces and capable of performing communication with other devices by using the server certificate. Also, the communication in which the server certificate is to be used is not limited to the communication of an image file, and may be webpage data that is to be transmitted in response to a communication request for requesting webpage data based on a web server function of the printer PR, for example.

(Modified Embodiment 7)

In the respective illustrative embodiments, the printer PR is configured to select the server certificate based on the destination IP address included in the communication request. Instead of this configuration, the printer PR may be configured to select the server certificate by determining whether the interface, which is to be used upon the reception of the communication request, is the wired I/F 20 or the wireless I/F 22.

Also, in the respective illustrative embodiments, the printer PR can validate both the wired I/F 20 and the wireless I/F 22 at the same time (i.e., the printer PR can be enabled to belong to both the wired LAN and the wireless LAN at the same time). In a modified embodiment, in a case where the printer PR validates any one of the wired I/F 20 and the wireless I/F 22, the printer PR may disable the communication using the other interface. In this case, the printer PR may be configured to determine whether the printer PR belongs to the wired LAN or the wireless LAN when the power supply of the printer PR becomes ON, and generate the server certificate including a host name according to a result of the determination, as the owner information.

(Modified Embodiment 8)

In the respective illustrative embodiments, the CPU 32 of the printer PR executes the program (i.e., the software), so that the respective processing of FIGS. 2 to 7 is implemented. Instead of this configuration, at least one of the respective processing of FIGS. 2 to 7 may be implemented by hardware such as a logical circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness.

What is claimed is:

1. A communication device comprising:
   a first interface configured to perform communication using a first network;
   a second interface configured to perform communication using a second network, the second interface being different from the first interface;
   a processor; and
   a memory storing first device identification information for identifying the communication device in the first network, second device identification information for identifying the communication device in the second network, and instructions, the second device identification information being different from the first device identification information, and the instructions, when being executed by the processor, causing the communication device to perform:
   generating a first server certificate including the first device identification information as owner information and a second server certificate including the second device identification information as the owner information, the second server certificate being different from the first server certificate;
   storing, in the memory, a first IP address in association with the first server certificate, the first IP address being allotted to the first interface;
   storing, in the memory, a second IP address in association with the second server certificate, the second IP address being allotted to the second interface, and the second IP address being different from the first IP address;
   receiving a communication request which requests execution of target communication with the communication device, the target communication using a server certificate;
   determining whether the communication request is a first communication request received from a first specific device belonging to the first network through the first interface or a second communication request received from a second specific device belonging to the second network through the second interface, the communication request being determined as the first communication request in a case where the communication request includes the first IP address, and the communication request being determined as the second communication request in a case where the communication request includes the second IP address;
   executing target communication with the first specific device through the first interface by using the first server certificate including the first device identification information and stored in association with the first IP address, in a case where the first communication request including the first IP address is received from the first specific device; and
   executing target communication with the second specific device through the second interface by using the second server certificate including the second device identification information and stored in association with the second IP address, in a case where the second communication request including the second IP address is received from the second specific device.

2. The communication device according to claim 1, wherein the generating comprises storing both the generated first server certificate and the generated second server certificate in the memory, wherein the instructions stored in the memory, when executed by the processor, cause the communication device to further perform:

selecting the first server certificate in a case where the first communication request is received from the first specific device in a state where both the first server certificate and the second server certificate are stored in the memory, and selecting the second server certificate in a case where the second communication request is received from the second specific device in a state where both the first server certificate and the second server certificate are stored in the memory, wherein the target communication with the first specific device through the first interface by using the first server certificate is executed in a case where the first server certificate is selected, and wherein the target communication with the second specific device through the second interface by using the second server certificate is executed in a case where the second server certificate is selected.

3. The communication device according to claim 2, wherein the generating comprises:

acquiring the first device identification information and the second device identification information from the memory in response to the communication device being started up;

generating the first server certificate and the second server certificate by using the acquired first device identification information and the acquired second device identification information; and storing both the generated first server certificate and the generated second server certificate in the memory.

4. The communication device according to claim 1, wherein the generating comprises:

acquiring the first device identification information from the memory and generating the first server certificate by using the acquired first device identification information in response to receiving the first communication request from the first specific device; and acquiring the second device identification information from the memory and generating the second server certificate by using the acquired second device identification information in response to receiving the second communication request from the second specific device, wherein the target communication with the first specific device through the first interface by using the first server certificate is executed in a case where the first server certificate is generated, and wherein the target communication with the second specific device through the second interface by using the second server certificate is executed in a case where the second server certificate is generated.

5. The communication device according to claim 1, wherein the first device identification information is a first host name for identifying the communication device in the first network, and wherein the second device identification information is a second host name for identifying the communication device in the second network.

6. The communication device according to claim 1, wherein the communication device is configured to execute at least one of a printing function and a scanning function.

7. The communication device according to claim 1, wherein the first interface is a first hardware interface configured to execute the target communication using the first network which is a wired network, and wherein the second interface is a second hardware interface configured to execute the target communication using the second network, which is a wireless network, the second hardware interface being different from the first hardware interface.

8. The communication device according to claim 1, wherein the first interface is a first software interface configured to execute the target communication using the first network which is a wireless network including an access point, and wherein the second interface is a second software interface configured to execute the target communication using the second network which is a wireless network not including an access point, the second software interface being different from the first software interface.

9. The communication device according to claim 8, wherein the second software interface is configured to execute the target communication using Wi-Fi Direct method.

10. The communication device according to claim 1, wherein the memory further stores web page data related to a web page, wherein the web page data is communicated by the target communication with the first specific device through the first interface by using the first server certificate, and wherein the web page data is communicated by the target communication with the second specific device through the second interface by using the second server certificate.

11. The communication device according to claim 1, wherein the first device identification information includes the first IP address, and wherein the second device identification information includes the second IP address.

* * * * *